United States Patent [19]

Morgan, Jr. et al.

[11] Patent Number: 4,467,617

[45] Date of Patent: Aug. 28, 1984

[54] ENERGY MANAGEMENT SYSTEM FOR CHILLED PRODUCT VENDING MACHINE

[75] Inventors: Annis R. Morgan, Jr.; Eddie W. King, both of Atlanta, Ga.

[73] Assignee: The Coca-Cola Company, Atlanta, Ga.

[21] Appl. No.: 466,959

[22] Filed: Feb. 16, 1983

Related U.S. Application Data

[63] Continuation of Ser. No. 198,172, Oct. 17, 1980, abandoned.

[51] Int. Cl.[3] .................... F25D 17/06; G05D 23/32

[52] U.S. Cl. .................................... 62/180; 62/158; 62/182

[58] Field of Search ................ 62/150, 158, 177, 180, 62/182, 234, 231, 155, 282, 82, 157, 186

[56] References Cited

U.S. PATENT DOCUMENTS

| | | | |
|---|---|---|---|
| 2,962,872 | 12/1960 | Crotser et al. | 62/155 |
| 3,373,577 | 3/1968 | Bohman | 62/180 |
| 3,747,361 | 7/1973 | Harbour | 62/157 |
| 3,877,243 | 4/1975 | Kramer | 62/180 |
| 4,021,213 | 5/1977 | Neidhardt et al. | 62/180 |
| 4,075,864 | 2/1978 | Schrader | 62/180 |
| 4,094,166 | 6/1978 | Jerles | 62/158 |
| 4,136,730 | 1/1979 | Kinsey | 62/231 |

FOREIGN PATENT DOCUMENTS

| | | | |
|---|---|---|---|
| WO79/00239 | 12/1979 | PCT Int'l Appl. | 62/80 |
| 1449823 | 9/1976 | United Kingdom . | |

*Primary Examiner*—Harry B. Tanner

*Attorney, Agent, or Firm*—Birch, Stewart, Kolasch & Birch

[57] ABSTRACT

A control circuit for cycling the evaporator fans on and off independently of the operation of the compressor of the refrigeration system is described. The evaporator fan is cycled on with the compressor and continues to run during the entire compressor ON cycle. A first timer causes the evaporator fan to run for an additional delay period following the cycling OFF of the compressor and the fans continue to blow air over the evaporator coil until the temperature of the evaporator coil is sufficiently above the freezing point of water (32° F., 0° C.). The fans are then cycled OFF. A second cycling timer is provided to intermittently cycle the evaporator fans on and off for predetermined short intervals following the above-described delay period, and during the time when the compressor is OFF. A third timer is provided to preclude freezing of the vended products and/or the evaporator coil when a vending machine is disposed in a below-freezing environment. This timer is enabled when the thermostatic temperature switch, which controls the compressor, opens, and will time out to cycle ON the evaporator fans for continuous operation for a predetermined period of time of the temperature switch remains open in excess of a predetermined period of time.

4 Claims, 4 Drawing Figures

ENERGY MANAGEMENT SYSTEM FOR CHILLED PRODUCT VENDING MACHINE

This application as a continuation of copending application Ser. No. 198,172, filed on Oct. 17, 1980, now abandoned.

BACKGROUND OF THE INVENTION

1. Field of the Invention

The present invention relates to an energy conservation system for chilled-product vending machines. More specifically, the present invention relates to a control circuit for a convection type refrigeration system for a vending machine which dispenses chilled products such as beverage cans or bottles.

2. Description of the Prior Art

Heretofore, in refrigeration systems of vending machines including a compressor, a condenser, evaporator coil and an evaporator fan, the compressor has been cycled ON and OFF under the control of a thermostat, and the evaporator fan, which blows air over the evaporator coil to circulate chilled air throughout the vending machine, has been run continuously even during the periods when the compressor was OFF. The unnecessary high energy usage and waste caused by the continuous running of the evaporator fan or fans, has become a problem with the current high cost of energy. One logical solution to reducing the consumption of energy is to cycle the evaporator fan motor ON and OFF with the compessor thus decreasing the running time of the evaporator fan. However, this approach causes several problems, the discovery of which are part of the present invention.

Firstly, if the evaporator fan is cycled off in synchronism with the turning OFF of the compressor, freeze up of the evaporator coil can occur in humid, high temperature conditions. Secondly, by keeping the evaporator fan shut off during the compressor off cycles, large variations in temperature in the vending machine occur, creating large variations in temperature of the next to be vended products. Also, during this off period of the evaporator fan, large variations of temperature occur throughout the vending machine due to lack of air flow, and temperatures sensed by the thermostat which controls the compressor cycling are less accurate than desirable. Thirdly, when vending machines are located in below freezing environments, (32° F.) an idyl condition of the evaporator fan may permit the chilled products to freeze. That is, when the evaporator fan is running and blowing air over the evaporator coil and throughout the vending machine, this flow of air dissipates heat generated by the evaporator fan motors thus acting as a heater to prevent the stored products from freezing. Thus, the aforementioned problems exist when the evaporator fan is permitted to cycle on and off with the compressor, even though a substantial reduction in energy consumption results.

Accordingly, a need in the art exists for a system which will reduce the consumption of energy in the refrigeration system of a vending machine, but will at the same time solve the aforementioned problems of evaporator coil freeze up in high, humid temperature conditions; product freeze up in below freezing environmental conditions; and large variations in next to be vended products and temperature distribution throughout the vending machine.

SUMMARY OF THE INVENTION

Accordingly, it is a primary object of the present invention to provide an energy management system for a vending machine which conserves energy but still maintains efficient and accurate cooling of the vended products within acceptable limits.

It is a further object of the present invention to provide an energy management system for a vending machine which conserves energy but precludes freeze up of the evaporator coil in high, humid temperature conditions.

It is another object of the present invention to provide an energy management system for a vending machine whereby the vended products dispensed are within acceptable and predictable temperature ranges.

It is still another object of the present invention to provide an energy management system for a vending machine wherein temperature fluctuations throughout the volume of the vending machine are kept to a minimum.

It is yet another object of the present invention to provide an energy management system for a vending machine whereby product freeze up is precluded when the vending machine is located in below freezing environments.

These and other objects of the present invention are achieved by providing a control circuit including at least three (3) timers for cycling the evaporator fans on and off independently of the operation of the compressor of the refrigeration system. In the system of the present invention, the evaporator fan is cycled on with the compressor and continues to run during the entire compressor on cycle as is conventional, but by means of a first timer the evaporator fan is permitted to run for an additional delay period following the cycle OFF of the compressor. During this additional delay period of the evaporator fans, the fans continue to blow air over the evaporator coil until the temperature of the evaporator coil is sufficiently above the freezing point of water (32° F., 0° C.), and are then cycled off. In a typical example, this cycle off of the evaporator fan may be anywhere from two (2) to five (5) minutes after the compressor has cut off, which enables the temperature of the evaporator coil to reach stabilization above 32° F.

A second cycling timer is provided to intermittently cycle the evaporator fans on and off for predetermined short intervals following the above described delay period, and during the time when the compressor is off. This intermittent cycling of the evaporator fans on and off forces air through the product stacks of the vending machine to provide a relatively even distribution of temperature throughout the off period of the compressor to allow for proper and precise heat sensing of the product through the vendor thermostats. This intermittent actuation of the fans and flow of air also limits the fluctuation of drink temperature, maintaining them within acceptable tolerances.

A third timer is provided to preclude freezing of the vended products and/or the evaporator coil when a vending machine is disposed in a below freezing environment. This timer is enabled when the thermostatic temperature switch which controls the compressor opens, and will time out to cycle on the evaporator fans for continuous operation for a predetermined period of time if the temperature switch remains open in excess of a predetermined period of time, for example four (4) hours. That is, by sensing the compressor off period, (the period that the temperature switch is open), the evaporator fans are cycled on for a continuous period of operation to preclude freeze up of the products when the off period of the compressor (the temperature switch open) exceeds a predetermined limit such as four (4) hours.

An additional optional timer may be provided in combination with the other timers of the present invention for turning the refrigeration system on at a predetermined time in the morning and disabling the system at a predetermined time in the evening. This optional timer obviously would further assist in the energy conservation objectives of the present invention by shutting down all power consumption during the period that the vending machine is not in use.

The timers utilized in the control circuit of the present invention are electromechanical cam timers which are commercially available components and are hardwired in circuit with the power source and other components of the refrigeration system in a manner to be described hereinafter. However, it should be understood that the timing functions of the present invention could be performed by a general purpose digital computer or by microprocessor technology programmed to perform the desired functions.

BRIEF DESCRIPTION OF THE DRAWINGS

The objects and the attendant advantages of the present invention will become readily appreciated as the same become better understood by reference to the following detailed description when considered in conjunction with the accompanying drawings in which like reference numerals designate like parts throughout the Figures thereof, and wherein.

DETAILED DESCRIPTION OF THE DRAWINGS

Figure 1:
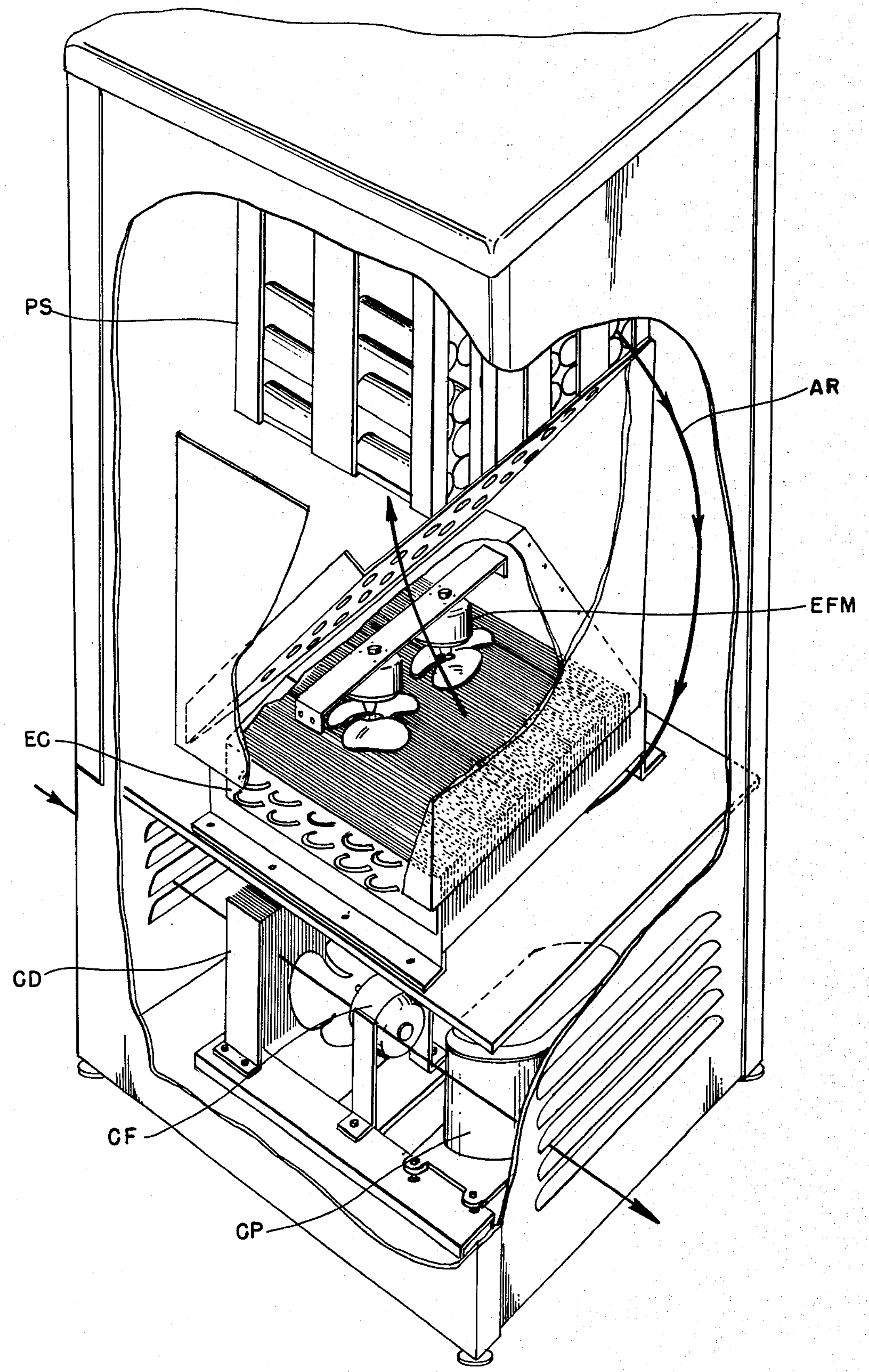
FIG. 1 is a cross sectional view of the inside of a typical chilled-product vending machine having a convection cooling system.

Referring in detail to FIG. 1, there is generally illustrated in cut away view a typical product vending machine wherein a plurality of products such as soft drink cans or bottles are stored in product stacks PS, from which they are sequentially dispensed on demand through appropriate vend slots in the bottom of the vending machine. As illustrated in FIG. 1, the vending machine thereof also includes a convection refrigeration system which includes the conventional components of a refrigeration compressor, having a fan CF and a pump CP, an evaporator coil EC, an evaporator fan motor EFM, and a thermostatic temperature switch TS (not shown), for controlling the operation of the refrigeration system in response to the temperatures sensed within the vending machine. The conventional convection refrigeration system illustrated in FIG. 1 operates to chill the products in product stacks PS, by blowing air by means of evaporator fan motor EFM over evaporator coil EC to thereby circulate chilled air between and throughout the product stacks PS. Air returns from the stacks as indicated by arrows AR. In conventional prior art convection refrigeration systems of vending machines known heretofore, the compressor C is cycled on and off under control of thermostatic temperature switch TS, while the evaporator fan motor EFM runs continuously, even during the periods that compressor C is de-energized. This continuous running of the evaporator fan motor EFM obviously expends alot of unnecessary electrical energy and generates heat leading to unnecessary energy waste. Accordingly, in accordance with the objects of the present invention, the control circuit of FIG. 2 was designed to energize the evaporator fan motor EFM only during optimum times when its operation is clearly needed. For example, in accordance with the present invention, the evaporator fan EFM operates continuously during the period that the compressor C is operating, operates for a predetermined delay period following the cycle OFF of the compressor in order to preclude freeze up of the evaporator coil EC, operates intermittently for predetermined periods when the compressor C is cycled OFF, and it is cycled ON to run continuously for a period following an interval when the compressor has not operated for an extended period of time, to preclude freezing of the products in the vending machine in sub-freezing environmental locations.

Figure 2:
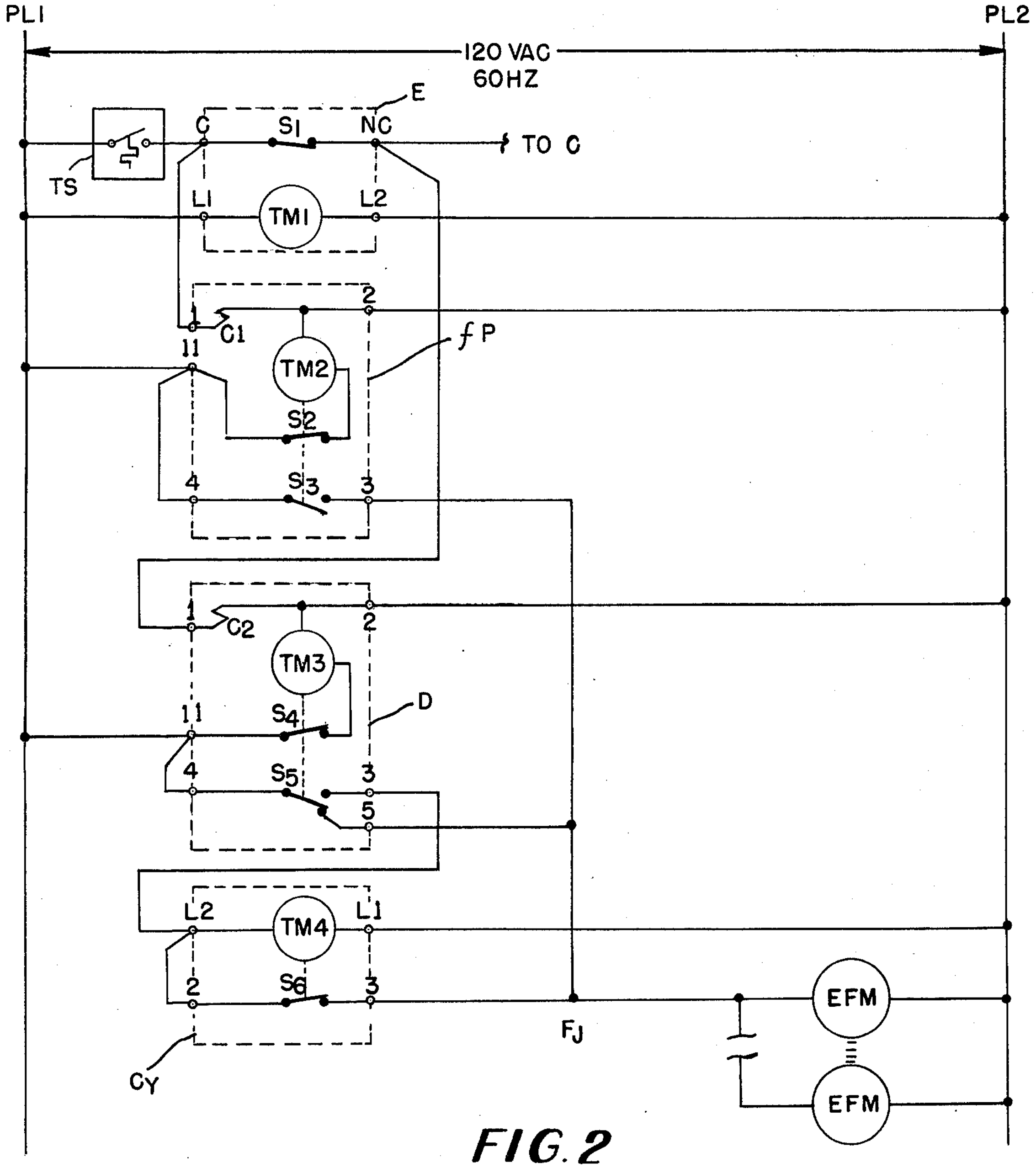
FIG. 2 is an electrical schematic diagram of the control circuitry of the present invention for operating the convection cooling system within the vending machine of FIG. 1.

Referring in detail to FIG. 2, there is illustrated an electrical circuit diagram of the control circuitry of the present invention for operating the convection refrigeration system illustrated in FIG. 1. A pair of main power lines PL1, PL2 are provided across which a conventional 120 volt, 60 HZ power source is connected. Also connected in parallel between power lines PL1, PL2 are a plurality of timers E, fp, D, Cy. Because these respective timers are connected in parallel, they are effectively hardwired in OR logic with respect to evaporator fan motors EFM. Thus, each of the respective timers E, fp, D and Cy can effect a time control function over evaporator fan motors EFM to be described in more detail hereinafter.

Beginning at the top of FIG. 2, the first timer E, may be a 24 hour clock controller for cycling the refrigeration system ON and OFF at predetermined times of day. That is, by means of timer E, the refrigeration system can be enabled or disabled for any specified period on a daily basis. Timer E is coupled to power line PL1 through a temperature switch TS at terminal C thereof. Included within timer E is time control switch S1 between terminals C and NC and a timer motor TM1 between terminals L1 and L2. Terminals NC is also coupled to the compressor and the condensor fan motors of the refrigeration system of FIG. 1 and terminals L1 and L2 are coupled to power lines PL1 and PL2, respectively. Timer E in one embodiment, is a multipulse cam timer manufactured by Eagle Signal Corporation, and identified as "multi-pulse timer catalog number MP-1-A6-32-MP5-48".

Timer fp is provided in the control circuit of FIG. 2 to energize evaporator fans EFM continuously when the compressor C of the refrigeration system has not operated for an extended period of time, for example four (4) hours or more. The failure of the compressor C to operate for such an extended period of time would normally occur when the vending machine is placed in a sub-freezing environment which eliminates the need for internal cooling of the machine. However, this sub-freezing environment also may create a problem in that the chilled products may freeze up when the machine is placed in extremely cold external environment conditions. Accordingly, the timer fp is utilized to sense these extended periods in which the compressor C does not run and turn ON the evaporator fans EFM to run continuously and thereby blow air over the products to preclude freeze up thereof. Timer fp includes external terminals 1, 2, 3, 4, and 11. Terminal 1 of timer fp is connected to terminal c of timer E. Terminal 2 of timer fp is externally connected to power line PL2. Terminal 3 of timer fp is connected to the terminal 5 of timer D and through junction FJ to fans EFM. Terminal 4 of timer fp is hardwired to terminal 11 thereof which in turn is coupled to power line PL1. Timer fp also includes a timer motor TM2 which is coupled at one end to a wire connecting terminals 1 and 2 thereof, and at an opposite end through a switch S2 to terminal 11. Also provided in the wire connection between terminals 1 and 2 of timer fp is a clutch coil C1. In additiion, a switch S3 is coupled between terminals 3 and 4 of timer fp. Timer fp may, for example, be an electromechanical cam timer manufactured by Eagle Signal Corporation under the description "Cycle-Flex timer catalogue number HP58-A6-01.

Timer D is provided to maintain evaporator fans EFM ON for a predetermined time or delay period after the compressor C is turned OFF. This delay period is necessary under some environmental conditions to preclude freeze up of the evaporator coil EC. That is, since evaporator fan motors EFM will continue to run at the end of a compressor cycle for a predetermined period of time, the temperature of the evaporator coil due to this moving air is elevated to a safe temprature above the freezing point of water before the evaporator fans EFM are turned OFF under the control of timer D. Timer D includes a plurality of external terminals numbered 1, 2, 3, 4, 5, and 11, in the same manner as the like terminals of timer fp. Timer D is in the preferred embodiment of the present invention, similar to timer fp with the exception of the specific function it performs, the addition of terminal 5, and the manner in which it is connected in the circuit of FIG. 2. Terminal 1 of timer D is connected to terminal NC of timer E. Terminal 2 of timer D is connected to power line PL2. Terminal 3 of timer D is connected to terminal L2 of timer Cy to be described hereinafter. Terminal 4 of timer D is hardwired to terminal 11 of timer D which is in turn, coupled to power line PL1. Terminal 5 of timer D is as stated hereinbefore, connected directly to terminal 3 of timer fp and through junction FJ to fans EFM. Timer D also includes a clutch coil C2 coupled between terminals 1 and 2 thereof, a timer motor TM3 connected between clutch coil C2 and terminal 2 at one end thereof, and an opposite end thereof coupled through a switch S4 to terminal 11. A switch S5 is also provided in timer D for completing a circuit between terminals 3 and 4 or terminals 4 and 5 as controlled by timer motor TM3 in a manner to be described hereinafter.

A cycle timer Cy is provided to intermittently energize evaporator fans EFM during periods in which the compressor C is de-energized. This is desirable in order to provide a more even temperature distribution throughout the vending machine during the off period of the compressor in order to enable more accurate temperature sensing within the vending machine during that period and a more limited fluctuation of the temperature of the chilled products in product stacks PS. Timer Cy includes a plurality of external terminals L1, L2, 2 and 3. Terminal L1 of timer Cy is coupled to power line PL2. Terminal L2 of timer Cy as stated hereinbefore, is coupled directly to terminal 3 of timer D. Terminal 2 of timer Cy is hardwired to terminal L2 of timer Cy. Terminal 3 of timer Cy is coupled through junction FJ to the evaporator fan motors of the refrigeration system of the present invention. A timer motor TM4 is provided within timer Cy between terminals L1 and L2 for the timed operation of a switch S6, coupled between terminals 2 and 3, in a manner to be more fully described hereinafter. Timer Cy in one embodiment of the present invention, is electromechanical cam timer manufactured by Eagle Signal Corporation under the description "flexopulse timer number HG-94-A6".

DESCRIPTION OF OPERATION

The operation of the control circuit of FIG. 2 can best be understood in conjunction with the timing diagrams of FIGS. 3 and 4 as described hereinafter.

Figure 3:
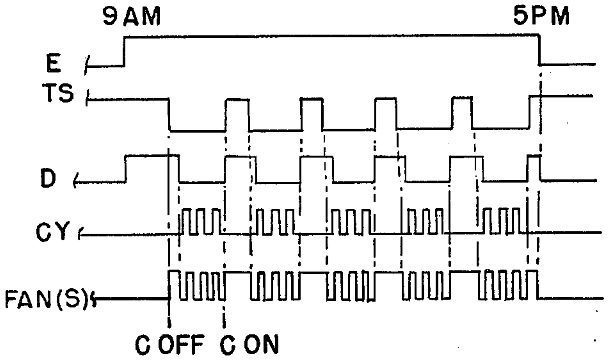
FIG. 3 is a timing diagram of the electrical signals present at selected terminals of the circuit diagram of FIG. 2 to be referenced hereinafter.

Referring in detail to FIG. 3, waveform E represents the output at terminal NC of timer E. Waveform TS represents the ON-OFF state of thermostatic temperature switch TS. Waveform D represents the output at terminal 5 of timer D over the control period ellustrated in FIG. 3. Waveform Cy represents the intermittent timing pulse output generated by timer Cy at output terminal 3 over the control period. The remaining waveform of FIG. 3 labeled FAN(S) illustrates the cycle of operation of the evaporator fan motors EFM in response to the timing controls provided by the waveforms E, TS, D, and CY.

Figure 4:
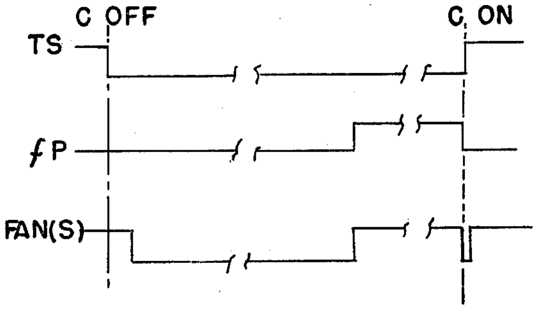
FIG. 4 is another timing diagram of electrical signals present at other terminals in the circuit of FIG. 2 to be referenced hereinafter.

Referring in detail to FIG. 4, there is illustrated a plurality of timing waveforms illustrating the function of timer fp. Waveform TS represents the ON-OFF periods of temperature switch TS. Waveform fp represents the output with respect to time at terminal 3 of timer fp and the waveform labeled FAN(S) illustrates the ON-OFF periods of the evaporator fans EFM in response to the combined control of temperature switch TS and timer fp.

Having now generally described the content of the timing diagrams of FIGS. 3 and 4, the detailed operation of the control circuitry of FIG. 2 may now be explained by reference to FIG. 2 in conjunction with FIGS. 3 and 4.

In normal operation the compressor C of the refrigeration system illustrated in FIG. 1 is turned on in response to the closing of temperature switch TS when the temperature within the vending machine rises above a predetermined level. However, temperature switch TS will not turn the compressor C on, unless switch S1 of timer E is closed providing a closed circuit path between power line PL1, the compressor and power line PL2. The function of switch S1 will be explained further hereinafter. The closing of temperature switch TS also provides a circuit path through clutch coil C1 of timer fp and power lines PL1 and PL2. That is, the closing of temperature switch TS energizes the clutch coil C1. With clutch coil C1 energized, timer motor TM2 of timer fp can not rotate. Timer E is an optional 24 hour clock/controller which may be utilized to turn the refrigeration system of the present invention ON and OFF for any specified period daily. For example, as illustrated in FIG. 3 by waveform E, the refrigeration system may be turned ON at 9:00 AM and OFF at 5:00 PM, by means of timer E. This ON-OFF period is controlled by timer E by the opening and closing of switch S1 which is controlled by timer motor TM1 in conjunction with appropriate timing cams. If this option is not required, switch S1 may be locked in a closed position to effectively short terminals C and NC and open terminals L1 and L2, thus eliminating the function of timer E. In this position, with switch S1 continuously closed, the enablement of the refrigeration system and compressor C are under the control of temperature switch TS.

The delay timer D is provided with a clutch coil C2 which is energized when temperature switch TS is closed. When clutch C2 is energized, timer motor TM3 does not run. However, at the end of a compressor cycle, when temperature switch TS opens, clutch C2 becomes de-energized timer motor TM3 begins to run, and runs until it times out. Switch S5 remains in the position shown between terminals 4 and 5 until timer motor TM3 is timed out, thus completing a circuit from power line PL1 through junction FJ, to evaporator fan motors EFM. At the beginning of any cycle of operation of the compressor C, switch S5 is normally in the position shown connecting terminals 4 and 5 of timer D, and therefore, power is supplied to evaporator fan motors EFM from power line PL1 via terminals 4, 5 of timer D; and junction FJ. Timer D determines how long power is to be applied to the evaporator fan motors following the cut-off time of the compressor determined by temperature switch TS. That is, as temperature switch TS opens, clutch coil C2 becomes de-energized permitting timer TM3 to time out, at which time switch S5 switches from terminal 5 to terminal 3, thus interrupting the supply of power to evaporator fan motors EFM. With switch S5 coupling terminals 4 and 3 of timer D together, the cycle timer Cy is enabled.

Thus, the cycle timer Cy, timer motor TM4, runs continuously following each delay period generated by timer D, until reset by the ending of another delay period. The cycle timer alternately opens and closes the contacts between terminal 2 and 3 of timer Cy at a selectable rate to create the small pulse waveform illustrated as Cy in FIG. 3. Thus, as shown in the bottom waveform "FAN(S)" of FIG. 3, the evaporator fans EFM intermittently cycle ON and OFF following each delay period controlled by timer D. Thus, the evaporator fan motors EFM, as illustrated in FIG. 3 are turned ON for the entire period that the compressor is turned ON, remain ON for a delay period determined by timer D, and are intermittently turned ON following each delay period and during the period preceeding the next compressor ON time. The compressor ON and compressor OFF times are labeled $C_{ON}$ and $C_{OFF}$, respectively in FIG. 3. Thus, the operation of timers E, D, and Cy have now been described with reference to FIG. 3.

The operation of the timer fp which prevents freeze up of vended products in sub-freezing environments may now be understood with reference to FIG. 4 and in conjunction with FIG. 2. As illustrated by the top waveform TS in FIG. 4, the temperature switch TS is closed and opens to turn the compressor OFF at the time indicated $C_{OFF}$ in FIG. 4, at which time power is removed from clutch coil C1 of timer fp When this occurs, timer motor TM2 is permitted to rotate to begin its timing function. If the temperature switch TS remains open for a predetermined period, for example, four (4) continuous hours, timer fp will time out closing the contacts between terminals 3 and 4 thereof by switch S3. The closure of switch S3 completes the circuit to the evaporator fan motors EFM between power lines PL1 and PL2. The evaporator fans will then run continuously until such time that the temperature switch again closes which energizes clutch coil C1 to stop the operation of the timer motor. When this occurs, timer fp is automatically reset to its initial condition in readiness for subsequent actuation in response to a compressor OFF period in excess of said predetermined period of four (4) hours. It should be understood that the period of four (4) hours is exemplary only, and that the predetermined time period selected will vary depending on the type of vending machine being controlled. Thus, by the continuous operation of the evaporator fan motors following a long compressor OFF period indicative of sub-freezing conditions in the environment, freeze up of products in the vending machine are precluded by the heating effect of the moving air circulating throughout the vending machine.

It should be understood that the system hereinbefore described may be modified as would occur to one of ordinary skill in the art, without departing from the spirit and scope of the present invention.

We claim:

1. In a refrigeration system for a chilled product vending machine including a refrigeration compressor, temperature sensor means for detecting the temperature within said vending machine and turning said compressor ON and OFF to define a compressor cycle in response to the detection of predetermined temperature limits, an evaporator coil and evaporator fan means for blowing air across said evaporator coil and circulating said air throughout said vending machine, the improvement comprising:

- means for turning said evaporator fan means ON simultaneously with said compressor for a time period at least as long as said compressor cycle;
- means for turning sid evaporator fan means OFF a predetermined period of time after said compressor is turned OFF, said period of time being long enough to permit the temperature of said evaporator coil to temperature stabilize above the freezing temperature of water and
- cycle timer means for intermittently turning said evaporator fan means ON and OFF for predetermined periods between said compressor cycles to thereby circulate air over the chilled products, maintain an even distribution of chilled air within said machine and minimize temperature fluctuations of the chilled products.

2. In a refrigeration system for a chilled product vending machine including a refrigeration compressor, temperature sensor means for detecting the temperature within said vending machine and cycling said compressor ON and OFF to define a compressor cycle in response to the detection of predetermined temperature limits, an evaporator coil and evaporator fan means for blowing air across said evaporator coil and circulating said air throughout said vending machine, the improvement comprising:

- sensor means for detecting when said compressor is cycled OFF;
- timer means responsive to said sensor means for measuring the length of time that said compressor is cycled OFF and for generating an enabling signal when said length of time exceeds a predetermined duration; and
- circuit means responsive to said enabling signal for cycling said evaporator fan means ON continuously until said compressor turns ON.

3. In a refrigeration system for a chilled product vending machine including a refrigeration compressor, temperature sensor means for detecting the temperature within said vending machine and turning said compressor ON and OFF to define a compressor cycle in response to the detection of predetermined temperature limits, an evaporator coil and evaporator fan means for blowing air across said evaporator coil and circulating said air throughout sid vending machine, the improvement comprising:

means for turning said evaporator fan means ON simultaneously with said compressor for a time period at least as long as said compressor cycle;

means for turning said evaporator fan means OFF a predetermined period of time after said compressor is turned OFF, said period of time being long enough to permit the temperature of said evaporator coil to temperature stabilize above the freezing temperature of water;

sensor means for detecting when said compressor is turned OFF;

timer means responsive to said sensor means for measuring the length of time that said compressor is turned OFF and for generating an enabling signal when said length of time exceeds a predetermined duration; and circuit means responsive to said enabling signal for turning said evaporator fan means ON continuously until said compressor turns ON.

4. The system of claim 2 wherein said temperature sensor means includes an electrical switch which opens to turn said compressor OFF and said sensor means detects the opening of said switch.

* * * * *

UNITED STATES PATENT AND TRADEMARK OFFICE
CERTIFICATE OF CORRECTION

PATENT NO. : 4,467,617

DATED : August 28, 1984

INVENTOR(S) : Annis R. Morgan, Jr. et al

It is certified that error appears in the above-identified patent and that said Letters Patent is hereby corrected as shown below:

In column 8, Line 36 change "sid" to --said--.

Signed and Sealed this

*Ninth* Day of *April 1985*

[SEAL]

*Attest:*

DONALD J. QUIGG

*Attesting Officer* *Acting Commissioner of Patents and Trademarks*